SLOWLY SOLUBLE AMMONIUM POLYPHOSPHATE

INFRARED SPECTRA OF $(NH_4)_{N+2} P_N O_{3N+1}$ (AVERAGE N = 51)

United States Patent Office 3,342,579
Patented Sept. 19, 1967

3,342,579
SLOWLY SOLUBLE AMMONIUM POLYPHOSPHATE AND METHOD FOR ITS MANUFACTURE
Alva W. Frazier, Florence, Ala., assignor to Tennessee Valley Authority, a corporation of the United States
Filed Oct. 12, 1964, Ser. No. 403,414
7 Claims. (Cl. 71—34)

My invention relates to a new high-analysis, slowly soluble solid fertilizer material containing a total plant food content ($N+P_2O_5$) of greater than about 87 weight percent, and more particularly to such a slowly soluble solid fertilizer material produced by reacting anhydrous ammonia and highly concentrated superphosphoric acid and the subsequent treatment of the molten gel formed thereby.

Heretofore the two principal approaches directed to controlling the rate of dissolution of fertilizers when applied to the soil have been either the production of slowly soluble chemical compounds, such as certain types of urea formaldehyde compounds (known by the trade name Ureaform), or the method of coating fertilizer pellets with insoluble impervious shells. Such fertilizer materials having controlled rates of dissolution have numerous advantages over untreated water-soluble fertilizer compositions. Such treated fertilizer materials greatly reduce the leaching of the fertilizer by movement of the soil solution, minimize luxury consumption of the fertilizer by the plant, lower toxicity to seedlings or plants due to salt concentration, and decrease the loss of fertilizer values due to decomposition of same to the gaseous phase. On the other hand, when untreated water-soluble fertilizer materials are applied to the ground, much of their nutrient values may be carried away by the natural or artificial ground drainage and so wasted as far as useful contribution to the growth of the crop for which they are supplied. In fact, experiments have shown that as much as 80 percent of the fertilizer may be so wasted; therefore, smaller quantities of fertilizers having controlled dissolution rates can give the same effect as a larger quantity of hygroscopic, untreated fertilizer material, or the same quantity of fertilizer having a controlled dissolution rate can give a more prolonged effect throughout the growing season.

In the past, however, water-soluble fertilizer compositions treated for delayed dissolution or "waterproofing" had some outstanding disadvantages. Among these disadvantages is the fact that both types of commercial product, viz. the slowly soluble chemical compound and the waterproofed fertilizer salt pellets, have been found to be expensive and difficult to produce; and neither can be utilized in commercial farm crop applications because of the premium cost of the fertilizer. As used in this specification, the term "pellet" is used to include granules, prills, and other types of sized particles.

As heretofore carried out, the approach of coating fertilizer pellets with insoluble impervious shells has generally been accomplished by applying the coating agent in a liquid condition to the individual particles of the hygroscopic fertilizer material. The results of such procedures, however, have not been found to be altogether satisfactory. Thus, it was frequently found in the case wherein the impervious shell comprised an oil or oil-like material that, if sufficient oil were employed to waterproof the material, the physical and chemical properties of the coated material were markedly and adversely affected. This is particularly noticeable in waterproofing water-soluble ingredients, such as urea and the like. Various other prior-art methods for bringing about a waterproofing effect for soluble fertilizer materials have included, for example, coating with lycopodium starch, other light powdery materials, and a waterproofing agent consisting of the metallic salts of high molecular weight fatty acids.

With reference to the above-mentioned approach of controlling the rate of dissolution of fertilizer materials by means of producing slowly soluble chemical compounds, a recent development along these lines is disclosed in U.S. Patent No. 3,024,098, Strand et al. Strand teaches that his fertilizer product is characterized by containing sufficient amounts of nutrients in a concentration nontoxic to the plants so as to release them slowly and gradually in the soil and make them available during at least the first full growing season of the plant. In accordance with his teachings, he produces a unitary fertilizer product by preparing a finely divided mass comprising essentially at least one nutrient constituent selected from the group consisting of certain types of urea formaldehyde compounds and phosphorus-containing compounds. The mass is then compressed in a suitable apparatus into unitary products of predetermined substantially uniform size corresponding to the weight in the range from about 1 to 30 grams with a resulting fertilizer product containing sufficient amounts of nutrient in a highly concentrated but slowly soluble form.

Prior-art processes and methods for the production of slowly soluble fertilizer compositions by either of the prior-art approaches have proved, in some instances, to be operative. However, the industry has long felt the need for a high-analysis, slowly soluble fertilizer material which may be produced without the undesirable step of coating otherwise highly water-soluble materials, which coating step obviously necessitates additional manpower and equipment requirements. In addition, the industry has long desired a high-analysis, slowly soluble fertilizer material and method for its manufacture, which material may be produced from the commercially available and economically attractive chemical compositions which heretofore have been utilized in the preparation of high-analysis liquid mixed fertilizers and also relatively high-analysis but highly water-soluble solid mixed fertilizers.

My invention is directed to a new composition of matter and the method for its manufacture, which is a high-analysis, slowly soluble fertilizer material produced from the commercially available starting materials, anhydrous ammonia and superphosphoric acid.

The term "superphosphoric acid" has become widely accepted in the industry during the past several years and it or its analogy, polyphosphoric acid, is a generic term used to define the phosphoric acids having less water of constitution than orthophosphoric acid. Whereas orthophosphoric acid contains one atom of phosphorus per molecule and has a theoretical mol ratio of water to phosphorus pentoxide of 3.0 or greater, the polyphosphoric acids have two or more atoms of phosphorus in a chain or ring structure in alternating sequence with oxygen, and a theoretical mol ratio of water to phosphorus pentoxide less than 3. Polyphosphoric acid has two general forms, the acyclic and the cyclic, commonly called metaphosphoric acid. In the acyclic form, which is derived by limited molecular dehydration of orthophosphoric acid, the individual chains of phosphorus and oxygen atoms have terminal ends and a theoretical mol ratio of water to phosphorus pentoxide between 2 and 3. In metaphosphoric acid, which is derived from the acyclic form by continued molecular dehydration, the chain is endless, forming ring structures. Metaphosphoric acids have theoretical mol ratios of water to phosphorus pentoxide of 2 or less. In practicing my invention, the acyclic species is formed by concentration of the ortho form, however, the concentration or dehydration of the acid is stopped before the meta species is formed, since not only is this species ineffective in preventing the formation of precipitates in neutral salt solutions, but metaphosphoric acid forms salts with the metal impurities which are also insoluble in the acid.

The empirical formula for the desired acyclic polyphosphoric acid is:

$$H_{n+2}P_nO_{3n+1}$$

where

H represents hydrogen,
P represents phosphorus,
O represents oxygen, and $n$ is greater than 1.

When $n=2$, the species is commonly known as pyrophosphoric acid; when $n=3$, the species is tripolyphosphoric acid.

I have overcome the disadvantges inherent in both of the approaches for producing either slowly soluble fertilizer materials or fertilizers of controlled solubility of the type shown in the prior art to a substantial extent in the present invention by providing a composition of matter which contains at least approximately 87 percent of its weight in a form available as plant food and which is produced by a process of reacting anhydrous ammonia with concentrated phosphoric acid at elevated temperatures and pressures; withdrawing from such reacted mass a molten gel-like material; and subsequently treating same with an aqueous medium to precipitate therefrom my new composition of matter. Furthermore, several new and advantageous features over the conventional processes for preparing fertilizer materials of controlled nutrient availability or solubility are realized by the present invention.

Among these advantageous features are: a simple and inexpensive process for producing a slowly soluble, high-analysis solid fertilizer material; a means for utilizing two of the most economically attractive fertilizer raw materials—anhydrous ammonia and superphosphoric acid—and a means of treating and combining said economically attractive raw materials such that a subsequent treatment thereof with perhaps the cheapest raw material available to the chemist, to wit, water, brings about a new, unique, and totally unexpected result in the production of my new composition of matter.

It is therefore an object of the present invention to provide a new high-analysis, slowly soluble solid fertilizer composition of matter and a process for its production, which composition contains unusually high amounts of available plant food, and which composition of matter is produced by a unique process and combination of process steps wherein the raw material constituents are simply anhydrous ammonia, superphosphoric acid, and water.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

In carrying out the objects of my invention in one form thereof, I employ in part, improve upon, and deviate from certain process steps found in the copending application of Travis P. Hignett et al., Ser. No. 136,960, filed Sept. 8, 1961, for "High-Analysis Ammonium Polyphosphate Fertilizer," now U.S. Patent Number 3,171,733 and assigned to the assignee of the present invention. In the application of Hignett et al., there is taught the production of a new high-analysis solid fertilizer material which is extremely water-soluble and suitable for preparing high-analysis liquid mixed fertilizers and which is produced by reacting anhydrous ammonia and superphosphoric acid under heat and pressure. In such disclosure, superphosphoric acid and anhydrous ammonia are fed into a reaction vessel, which reaction vessel is equipped with a motor-driven agitator running at such speed as to insure rapid and intimate mixing of the acid and anhydrous ammonia to keep the resulting mixture in vigorous agitation until the reaction is complete. In addition, the reaction vessel may be equipped with cooling coils, which in turn may be disposed in a baffle-like arrangement to increase the degree of agitation resulting from the action of the motor-driven agitator. The product from Hignett's reaction vessel is discharged as a molten reacted melt, which molten reacted melt must be subsequently subjected to agitation in order to cause the molten material to set up into hard granules. In my process, I follow substantially the same steps of Hignett up to the discharge of the molten reacted material with one deviation therefrom, to wit, I have found that in order to produce the material of my invention, the superphosphoric acid fed to the reaction vessel must contain at least 83 percent $P_2O_5$. My invention, together with further objects and advantages thereof, will be better understood from a consideration of the additional following description taken in connection with the accompanying drawings in which:

Figure 1:
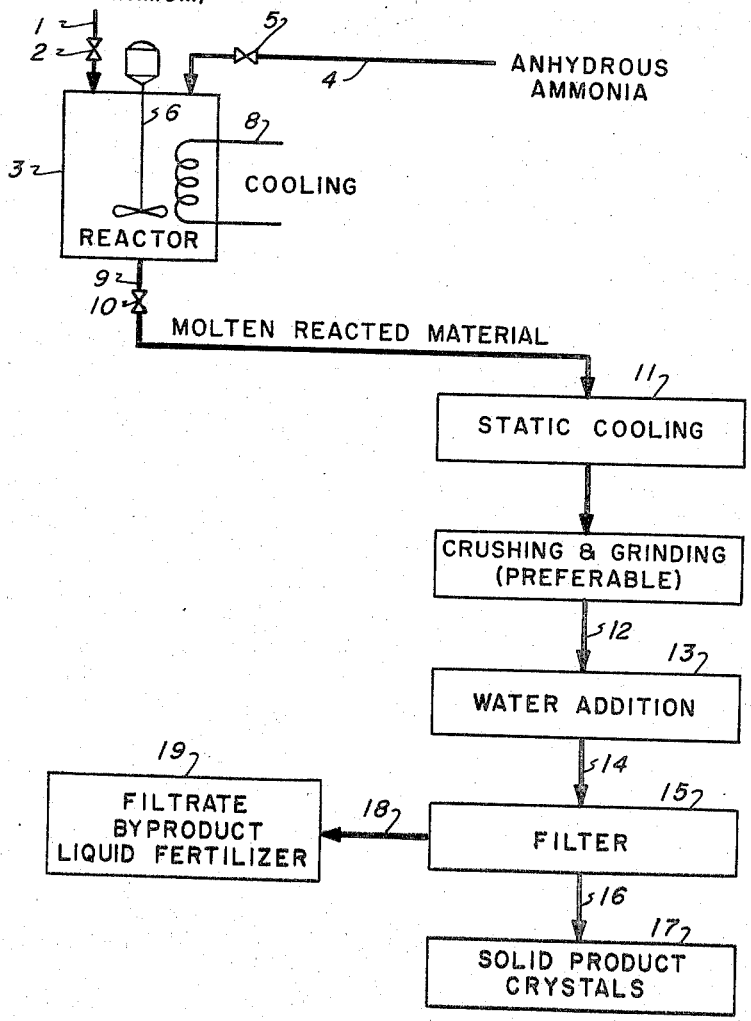
FIGURE 1 is a flowsheet illustrating the principles of my process which results in my new composition of matter having the novel properties mentioned above.

Referring now more specifically to FIGURE 1, superphosphoric acid (containing at least 83 percent $P_2O_5$) from a source not shown is fed through line 1 and any suitable means for controlling the rate of flow 2 into reaction zone comprising vessel 3. Anhydrous ammonia from a source not shown is fed into vessel 3 through line 4 and means for controlling the rate of flow 5. Vessel 3 is equipped with a motor-driven agitator 6 running at such speed as to secure rapid and intimate mixing of acid and anhydrous ammonia and to keep the resulting mixture in vigorous agitation until reaction is complete. Cooling coils 8 are located within vessel 3 and may be disposed in a baffle-like arrangement to increase the degree of agitation resulting from the action of agitator 6. I prefer to introduce a stream of superphosphoric acid at a steady rate of flow according to the capacity of the equipment to vary the rate of introduction of anhydrous ammonia as may be necessary to maintain the desired pressure of access ammonia in the reactor.

The intermediate product is discharged from reactor vessel 3 through line 9 and any suitable means for controlling the rate of flow 10 as a molten reacted material. Until now, the steps of my process are substantially similar to those of the Hignett et al application referred to supra, with the notable exception that I have found that the superphosphoric acid introduced into vessel 3 must contain at least 83 percent $P_2O_5$, whereas Hignett et al preferred to use superphosphoric acid in the range from 75 to 80 percent $P_2O_5$. In the subsequent steps of my process, I now deviate from the disclosure of Hignett in that Hignett discloses that the melt taken from line 9 is solidified upon subsequent cooling and that he has found that agitation in his cooling vessel is an absolute requirement to cause his molten material to set up into hard granules, which resulting hard granules, according to his teachings, are extremely water soluble as opposed to the ultimate material of the present invention which is in the form of a crystalline material that has the desired properties of being a slowly soluble, high-analysis solid fertilizer composition. Following herewith are the steps of my deviation from Hignett which results in the desired new composition of the present invention.

The molten material from reactor vessel 3 is led via line 9 and any suitable means for controlling the rate of flow 10 as a melt into a static cooling vessel 11, wherein the hot molten melt is slowly and statically cooled from the discharge temperature of vessel 3 of approximately 325° F. to 475° F. down to the temperature range of about 100° F. or less. During this step of my process of statically cooling the molten melt down to the range specified, the melt gradually becomes gelatinous or glass-like in appearance. After cooling the melt in vessel 11, it is subsequently crushed and ground to about −8 mesh and led via line 12 into water addition vessel 13 wherein the now gelatinous mass is contacted with water. I have found that the volume ratio of the gelled material to the water contacted therewith may be in the range from about 0.1 to 5, and preferably approximately 2. After the addition of water to the gel in vessel 13, there is observed the heretofore unexpected precipitation of a copious white homogeneous crystalline phase, which is the new composition of the present invention. Subsequent to precipitation in vessel 3, the resulting suspension may be led via line 14 to filtering means 15, from which the desired solid white homogeneous crystalline product may be withdrawn via line 16 to product storage 17, and the resulting and remaining filtrate removed from filter means 15 via line 18 to storage as a useful clear liquid mixed fertilizer byproduct containing up to 55 percent total plant food and varying in grade from 10-33-0 to 12-42-0. Alternatively, my process may be operated such that the hot molten melt led from reactor vessel 3 via line 9 and means for control 10 may be introduced into cooling vessel 11 wherein after the static cooling to the desired temperature range has been achieved, water may be directly added to the resulting gelatinous mass within vessel 11 and the resulting slurry of the desired crystalline product and mother liquid fertilizer byproduct may then subsequently be sent to any desired filtering means.

As is readily apparent, I have discovered a new and unexpected result wherein the molten reacted material which is withdrawn from vessel 3 may be treated in such a way as to precipitate therefrom a new composition of matter which is a slowly water-soluble, high-analysis solid fertilizer composition by the relatively simple but unique method described supra, which method is predicated upon three simple but extremely critical factors, viz, (1) the initial concentration of the superphosphoric acid fed to the reactor vessel must contain at least 83 percent $P_2O_5$; (2) the molten reacted melt withdrawn from the reaction vessel must be (contrary to the teachings of Hignett et al.) slowly and statically cooled down to a temperature range of approximately 100° F. or less; and (3) the subsequent addition of water to the then resulting gelatinous like mass effects the unexpected precipitation of a slowly soluble, high-analysis fertilizer composition of the ammonium polyphosphate family. Thus, the three factors above provide a new composition of material which exhibits the physical property of water solubility completely unexpected from that which would result in following the teaching of Hignett et al. In addition to exhibiting physical properties different from that which would normally be expected, the composition of my new fertilizer material also exhibits a chemical empirical formula and other characteristics totally unknown up to the time of the present invention.

As is discussed in the teaching of the Hignett et al. application supra, the temperature in reactor 3 may be maintained in the range from about 325° F. to about 475° F. with the preferred temperature range being about 350° F. to about 385° F. Depending upon temperature and other variables, the retention time of the material in reactor vessel 3 may range from about 10 minutes to 3 hours, the preferred retention time being in the range from about 1 to 1.5 hours. It has been found that increasing the retention time increases the degree of ammoniation of the intermediate molten reacted product.

It has also been disclosed that the motor-driven agitator 6 provides vigorous agitation in the reactor vessel 3 and is required in order to effect intimate mixing of the anhydrous ammonia with the liquid ammonium polyphosphate in reactor 3. The intimate mixing so produced by agitator 6 has been found to increase the rate of reaction in vessel 3 and therefore the degree of ammoniation within a given retention time.

As in Hignett et al., the reactor was constructed of stainless steel (A.I.S.I. Type 316) and was of 1-gallon capacity. It was equipped with a turbine-type agitator and four baffles one-half inch in width by 11 inches high. Acid was fed from an overhead tank (25-gallon capacity) with a reciprocating piston-type pump. The length of stroke of the piston could be varied to give the desired feed rate. The acid was fed at rates to give 10 to 30 pounds of product per hour.

Gaseous ammonia was fed through a ½-inch line from pressure cylinders located outside the laboratory building. Warm water was sprayed on the cylinders to obtain pressures of up to about 325 p.s.i.g. as required. The ammonia was fed into the reactor through a ⅜-inch tube. The tube was closed at the end, and a one-hole sparger was made by drilling a 0.052-inch hole at the end of the tube. The sparger was located near the bottom of the reactor under the tip of the agitator. The reactor was equipped with a pressure gage, and the rate of feed of ammonia to the reactor was controlled manually with a throttling valve to give the desired pressure of excess ammonia in the reactor. The temperature was measured with a thermocouple and a recording potentiometer.

Since the reaction of ammonia and superphosphoric acid was highly exothermic, it was necessary to provide cooling. Hot water was used for cooling to prevent freezing of material on the cooling coil (freezing point of about 325° F.). The cooling coil was made of ⅜-inch stainless steel (A.I.S.I. Type 316) tubing. It provided 1 square foot of cooling area based on the external surface of the coil. The water was pumped through the cooling coil and discharged into a 1.5-gallon tank, from which it was recycled. This arrangement provided for utilizing the heat of reaction to heat the makeup water. The supply of cooling water in the tank remained at 212° F. Water was added to the supply tank as required to replace that evaporated.

Two electrical conductivity probes (electrodes), entering from the top of the reactor, were used to measure the level of the liquid in the reactor. The tips of the probes were ½-inch apart vertically. Each probe and the shell of the reactor formed a conductivity circuit. The liquid in the reactor completed the circuit when it touched a probe and caused a light bulb to burn. The reactor was operated to keep the level between the two probes, which was indicated by the top light being off and the other on. The level was controlled by the rate of drawoff of liquid from the bottom of the reactor by use of a ¼-inch throttling valve.

In the initial tests it was found that the degree of agitation in the reactor had a significant effect on the degree of ammoniation. The reactor first was equipped with a six-blade agitator impeller that was 2½ inches in diameter with blades ½-inch in width located one agitator diameter above the bottom of the reactor. The agitator was rotated at 600 r.p.m., and the degree of ammoniation was only about 5 pounds of ammonia per unit of $P_2O_5$. Increasing the width of the agitator blades to 2 inches increased the degree of ammoniation to 6.3 pounds of ammonia per unit of $P_2O_5$ when the speed of the agitator was 600 r.p.m. A further increase in degree of ammoniation to 7.5 pounds of ammonia per unit of $P_2O_5$ resulted when the speed of the agitator was increased to 1730 r.p.m. No further increase was obtained when the speed of the agitator was increased to 2130 r.p.m.

In initial tests the molten reacted melt from the reaction vessel was drawn off into one-gallon cans and allowed to cool statically and without agitation or vibration down to a temperature of approximately 85° F. After cooling to 85° F. a portion of the melt, which now appeared as a gelatinous or glass-like, clear, viscous mass, was contacted with water in the volume ratio of 500 cubic centimeters of gel to 500 cubic centimeters of water, whereupon a copious white precipitate of a homogeneous crystalline phase was observed to begin formation immediately, and which precipitation appeared completed after the last residual gel had dissolved. The copious white crystalline phase was filtered off, washed with water and then with acetone and air dried, and subsequently subjected to water solubility tests and found to be stable in aqueous medium and also at room temperature even at high humidity.

Figure 2:
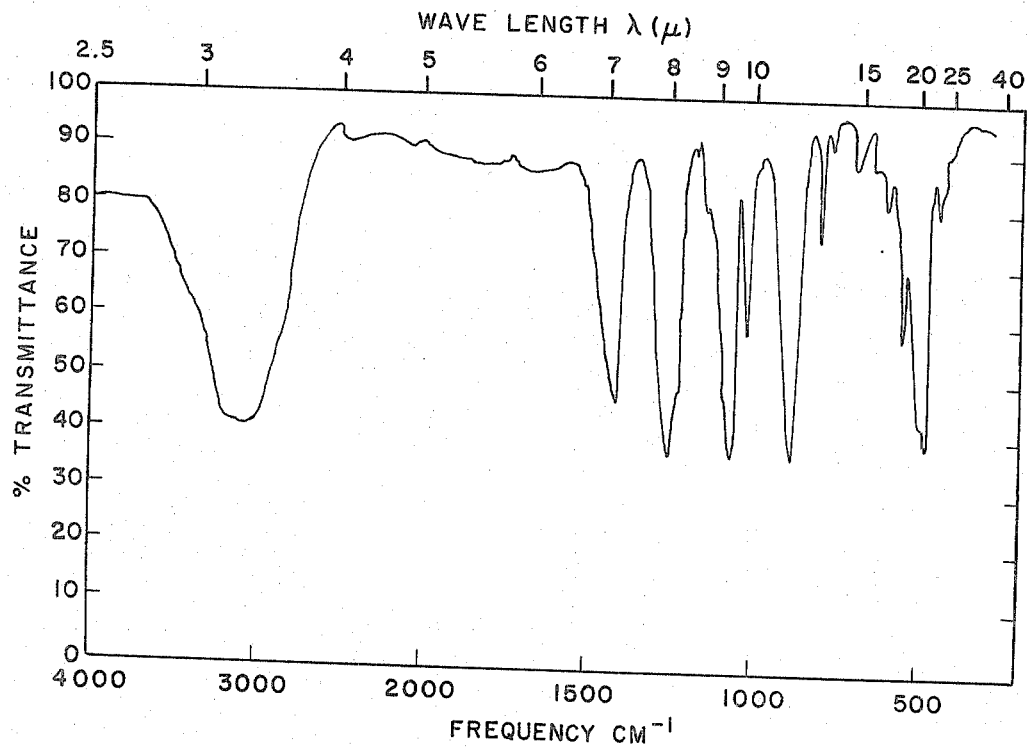
FIGURE 2 is an infrared spectra of $(NH_4)_{n+2}P_nO_{3n+1}$, where the average $n$ is 51.

Referring now more specifically to FIGURE 2, there is shown the infrared spectra of $(NH_4)_{n+2}P_nO_{3n+1}$ wherein average $n=51$. The spectra shown therein was obtained on a Perkin-Elmer 521 Grating Infrared Spectrophotometer, wherein the sample concentration in potassium bromide was 0.5 percent. Following is a tabulation of the infrared peak positions and intensities obtained from my new composition of matter.

Table I.—Position and intensities of infrared absorption bands frequency ($CM^{-1}$)

| | |
|---|---|
| 3400 | Sh |
| 3200–3000 | S–B |
| 1620 | VW–B |
| 1410 | MS–Sp |
| 1254 | S–Sp |
| 1220 | MS–Sp |
| 1131 | M–Sp |
| 1064 | S–Sp |
| 1015 | MS–Sp |
| 882 | S–Sp |
| 790 | M–Sp |
| 754 | W–Sp |
| 670 | W–Sp |
| 587 | M–Sp |
| 542 | MS–Sp |
| 477 | S–Sp |
| 426 | M–Sp |

Sh=shoulder; B=broad; S=strong; MS=medium strong; M=medium; W=weak; VW=very weak; Sp=sharp.

In order that those skilled in the art may better understand how the present invention may be practiced, the following examples are given by way of illustration and not by way of limitation.

EXAMPLE I

Superphosphoric acid (83 percent $P_2O_5$) was fed to a reactor at the rate of 22.6 pounds per hour. The flow of ammonia was regulated to give a pressure of 300 p.s.i.g. in the reactor. This resulted in a flow rate of 0.7 pound of ammonia per hour. The volume of the liquid retained in the reactor was 0.7 gallon. Retention time of the liquid in the reactor was approximately 170 minutes. The temperature in the reactor (380° F.) was controlled by regulating the flow of water through the cooling coil. The agitator (2¼ inch, 6-blade impeller) was rotated at 1000 r.p.m. The liquid intermediate molten melt was discharged from the reactor and approximately 5 pounds were collected and sent to static cooling for a period of approximately 24 hours until the material cooled down to a temperature of approximately 85° F., at which time it was contacted with approximately equal volume proportions of water and the precipitation of the copious white homogeneous crystalline phase was observed. During the crystallization, the salt crystallized rapidly as dissolution proceeded and, using 83 percent $P_2O_5$ acid, the yield is 36.5 percent of the phosphate originally charged to the reactor, which represents approximately 100 percent of the long-chain polyphosphate present in the gel in the original intermediate molten melt product. Using 87 percent $P_2O_5$ acid, the yield was increased to greater than 72 percent of the original phosphate charged, which again represented approximately 100 percent of the long-chain polyphosphate present in the gel according to chromatographic analysis. The salt was filtered off, washed with water and acetone, and air-dried.

The salt obtained as my product in this example was found to be a composition containing approximately 14.3 percent nitrogen and 72.9 percent $P_2O_5$. Further the dry crystals of my new composition were found to be stable at room temperature even at high humidity. They remained unchanged crystallographically on heating at 105° C. for 48 hours. The rate of solution of my new composition was observed to be extremely slow; only 0.1 gram dissolved in 100 milliliters of water in 24 hours at 25° C. In addition, differential thermal analysis only shows one indothermic peak due to melting and occurs at 355° C. when heated at the rate of 10 degrees per minute.

EXAMPLE II

A number of additional tests were carried out according to the procedure in Example I with the $P_2O_5$ content of the superphosphoric acid fed to the reaction vessel being increased from 83 percent up to approximately 87 percent and the desired products therefrom were preparations identified as long-chain ammonium polyphosphates which showed consistent X-ray diffraction patterns, optical properties, and chemical compositions of the composition $(NH_4)_{n+2}P_nO_{3n+1}$, in which average $n$ is 51 (plus 50 minus 6) within experimental error, approaching $$(NH_4PO_3)_x$$

The compositions crystallize as microscopic stubby rods that were rectangular prismatic and showed parallel extinction; $N\gamma=1.485$ (elongation axis), $N\alpha=1.500$. The symmetry appeared to be orthorhombic or higher, in accordance with its relatively simple X-ray diffraction pattern.

This ammonium polyphosphate showed no similarity to Maddrell's or Kurrol's salts in solubility, optical properties, X-ray diffraction pattern, or infrared absorption spectrum. This salt also differs from the Kurrol and Maddrell type in that it can be recrystallized from a hot water solution of the crystals. It has desirable fertilizer property of being a slowly soluble, single source of both nitrogen and phosphorus.

Following is a powder X-ray pattern of my new composition of matter and was obtained under the conditions where $CuK\alpha$ is equal to 1.5405 A.

Table II $[(NH_4)_{n+2}(P_nO_{3n+1})]$

| d, A. | I/I [2] | d, A. | I/I |
|---|---|---|---|
| 8.84 | 2 | 2.74 | 12 |
| 8.58 | 2 | 2.70 | 4 |
| 6.86 | 6 | 2.64 | 9 |
| 6.60 | 9 | 2.53 | 4 |
| 6.02 | 100 | 2.45 | 2 |
| 5.57 | 10 | 2.41 | 8 |
| 5.40 | 69 | 2.35 | 5 |
| 3.97 | 2 | 2.32 | 3 |
| 3.81 | 47 | 2.29 | 23 |
| 3.57 | 12 | 2.23 | 4 |
| 3.49 | 45 | 2.18 | 2 |
| 3.41 | 24 | 2.13 | 5 |
| 3.31 | 5 | 2.11 | 3 |
| 3.23 | 30 | 2.07 | 3 |
| 3.11 | 6 | 1.89 | 3 |
| 2.93 | 3 | 1.87 | 4 |
| 2.88 | 8 | 1.80 | 2 |
| 2.82 | 12 | | |

[1] Average chain length, $n=51\pm8$, based on chemical composition.
[2] Intensities read from X-ray goniometer tracings.

The results of these additional tests which were carried out according to the proceedings in Sample I, supra, further indicated that the $P_2O_5$ concentration of the superphosporic acid initially fed to the reactor has a direct effect on the proportion of long-chain polyphosphate in the melt. As in Example I above, my data indicate that the minimum $P_2O_5$ content of said superphosphoric acid fed to the reactor must be at least about 83 percent and as this percentage of $P_2O_5$ content is increased in the feed acid the yield of the long-chain polyphosphate extrapolates to approximately 100 percent in the melt when said feed acid contains approximately 90 to 92 percent $P_2O_5$. For instance, when the feed acid contains 83.5 percent $P_2O_5$ the yield of the long-chain polyphosphate is approximately 40 percent, which yield is increased to approximately 65 percent at an acid concentration of 85.4 percent P₂O₅, and which yield is increased to approximately 72 percent when the P₂O₅ acid concentration is 86.6 percent. In addition, there is evidence that the yield of the long-chain polyphosphate for any given feed acid $P_2O_5$ concentration may also be significantly increased by increasing either the pressure, temperature, and/or retention time in the reactor.

Further, the measurement and position of the infrared absorption frequencies indicate an absence of the phosphorus-nitrogen stretchings and bonding and show the ammonia as well as the P–O–P bounds. This indicates that I have the normal continuation of the polyphosphate nomenclature and long-chain P–O–P type of bonding structure in my new composition of matter.

While I have shown and described particular embodiments of my invention, modifications and variations thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. In a process for producing a high-analysis ammonium polyphosphate fertilizer material from anhydrous ammonia and highly concentrated superphosphoric acid, wherein is maintained in a closed reaction vessel at a temperature in the range from about 300° F. to about 600° F. and under a constant pressure in the range of about 10 p.s.i.g. to about 1000 p.s.i.g. a mass of molten material of low viscosity previously formed by combining such materials therein, wherein relatively small streams of said materials are continuously combined into said mass and said mass is continuously subjected to vigorous agitation, thereby keeping substantially the entire mass agitated and effecting immediate ammoniation of said inflowing acid, and wherein a mass of surplus molten ammonium phosphate material is withdrawn from the lower portion of said reaction vessel, the improvement therein which comprises the manufacture of a high-analysis, slowly soluble ammonium polyphosphate material from anhydrous ammonia and superphosphoric acid, said superphosphoric acid having a minimum concentration of 83% $P_2O_5$, said improvement combining with said aforementioned steps the following steps which comprise statically cooling said surplus molten ammonium polyphosphate material withdrawn from the lower portion of said reaction vessel from a temperature in the range of about 300° F. to about 600° F. down to a temperature in the range from about 100° F. to 0° F.; subsequently contacting the resulting gelatinous-like mass with aqueous medium, thereby effecting the precipitation of an insoluble long-chain ammonium polyphosphate salt; and recovering as product said salt.

2. The process of claim 1 wherein the volumetric ratio of aqueous medium added to said gelatinous-like mass is in the range from about 0.1 to about 5.

3. The process of claim 2 wherein the $P_2O_5$ concentration of the superphosphoric acid initially fed to said reactor is in the range from 83 percent to about 92 percent.

4. The process of claim 2 wherein the $P_2O_5$ concentration of the superphosphoric acid initially fed to said reactor is in the range from 83 percent to about 87 percent.

5. The process of claim 4 wherein said product contains approximately 14 percent N and 73 percent $P_2O_5$.

6. A new composition of matter comprising a high-analysis, slowly soluble ammonia polyphosphate fertilizer material having an empirical formula $(NH_4)_{n+2}P_nO_{3n+1}$, in which the average $n$ is 51, containing approximately 87 percent plant food, having solubility characteristics of approximately 0.1 gram per 100 cubic centimeters of water at 25° C. in 24 hours, said composition of matter exhibiting a long-chain acyclic structure characterized by alternate phosphorus-oxygen bonds, viz,

P—O—P—O—P—O to an average chain length of 51 phosphorus units.

7. A new composition of matter comprising a high-analysis, slowly soluble ammonia polyphosphate fertilizer material having an empirical formula $(NH_4)_{n+2}P_nO_{3n+1}$, in which the average $n$ is 51, containing approximately 87 percent plant food, having solubility characteristics of approximately 0.1 gram per 100 cubic centimeters of water at 25° C. in 24 hours, said composition of matter exhibiting a long-chain acyclic structure characterized by alternate phosphorus-oxygen bonds, viz,

P—O—P—O—P—O to an average chain length of 51 phosphorus units, which composition is characterized by powder X-ray pattern obtained under conditions where $CuK\alpha$ is equal to 1.5405 A., said pattern being as follows:

$[(NH_4)_{n+2}(P_nO_{3M+1})^1]$

| d, A. | I/I ² | d, A. | I/I |
|---|---|---|---|
| 8.84 | 2 | 2.74 | 12 |
| 8.58 | 2 | 2.70 | 4 |
| 6.86 | 6 | 2.64 | 9 |
| 6.60 | 9 | 2.53 | 4 |
| 6.02 | 100 | 2.45 | 2 |
| 5.57 | 10 | 2.41 | 8 |
| 5.40 | 69 | 2.35 | 5 |
| 3.97 | 2 | 2.32 | 3 |
| 3.81 | 47 | 2.29 | 23 |
| 3.57 | 12 | 2.23 | 4 |
| 3.49 | 45 | 2.18 | 2 |
| 3.41 | 24 | 2.13 | 5 |
| 3.31 | 5 | 2.11 | 3 |
| 3.23 | 30 | 2.07 | 3 |
| 3.11 | 6 | 1.89 | 3 |
| 2.93 | 3 | 1.87 | 4 |
| 2.88 | 8 | 1.80 | 2 |
| 2.82 | 12 | | |

¹ Average chain length, n=51±8, based on chemical composition.
² Intensities read from X-ray goniometer tracings.

and said composition of matter further characterized by the following tabulation of infrared peak positions and intensities:

*Position and intensities of infrared absorption bands frequency ($CM^{-1}$)*

| | |
|---|---|
| 3400 | Sh |
| 3200–3000 | S–B |
| 1620 | VW–B |
| 1410 | MS–Sp |
| 1254 | S–Sp |
| 1220 | MS–Sp |
| 1131 | M–Sp |
| 1064 | S–Sp |
| 1015 | MS–Sp |
| 882 | S–Sp |
| 790 | M–Sp |
| 754 | W–Sp |
| 670 | W–Sp |
| 587 | M–Sp |
| 542 | MS–Sp |
| 477 | S–Sp |
| 426 | M–Sp |

Sh=shoulder; B=broad; S=strong; MS=medium strong; M=medium; W=weak; VW=very weak; Sp=Sharp.

References Cited

UNITED STATES PATENTS

| 3,171,733 | 3/1965 | Hignett et al. | 71—48 |
| 3,228,752 | 1/1966 | Hignett et al. | 71—34 X |
| 3,241,946 | 3/1966 | Young | 71—43 |
| 3,243,269 | 3/1966 | Young | 23—107 X |

FOREIGN PATENTS

| 673,755 | 6/1952 | Great Britain. |

DONALL H. SYLVESTER, *Primary Examiner.*

T. D. KILEY, *Assistant Examiner.*